US012789839B2

(12) United States Patent
Gupta et al.

(10) Patent No.: US 12,789,839 B2
(45) Date of Patent: Nov. 10, 2026

(54) SYSTEMS AND METHODS FOR GENERATING PERSONALIZED ADVANCED DRIVER ASSISTANCE SYSTEMS

(71) Applicant: Toyota Motor Engineering & Manufacturing North America, Inc., Plano, TX (US)

(72) Inventors: Rohit Gupta, Santa Clara, CA (US); Amr Abdelraouf, Mountain View, CA (US); Kyungtae Han, Palo Alto, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 199 days.

(21) Appl. No.: 18/664,946

(22) Filed: May 15, 2024

(65) Prior Publication Data

US 2025/0353522 A1 Nov. 20, 2025

(51) Int. Cl.
*B60W 50/06* (2006.01)
*B60W 60/00* (2020.01)
*G06N 20/00* (2019.01)

(52) U.S. Cl.
CPC .......... *B60W 60/001* (2020.02); *B60W 50/06* (2013.01); *G06N 20/00* (2019.01); (Continued)

(58) Field of Classification Search
CPC ............... B60W 60/001; B60W 50/06; B60W 2540/221; B60W 2540/229; B60W 2556/10; B60W 2556/45; G06N 20/00
See application file for complete search history.

(56) References Cited

U.S. PATENT DOCUMENTS 10,366,612 B2 7/2019 Linder et al.
10,532,746 B2 1/2020 Park et al.
(Continued)

FOREIGN PATENT DOCUMENTS

IN 202311055609 A 9/2023
WO 2023126774 A1 7/2023

OTHER PUBLICATIONS

Ran Wei et al., "Modeling Driver Responses to Automation Failures With Active Inference", 2022, IEEE Transactions on Intelligent Transportation Systems, vol. 23, No. 10, Oct. 2022 (Year: 2022).*
(Continued)

*Primary Examiner* — Ashley L Redhead, Jr.
(74) *Attorney, Agent, or Firm* — Dinsmore & Shohl LLP

(57) ABSTRACT

Embodiments of systems and methods for generating personalized Advanced Driver Assistant Systems (ADAS) include one or more processors, one or more action engines, and one or more communication devices. The processors are operable to filter current driving data of a vehicle including environmental data and one or more driver states associated with a current driver, label the filtered driving data based on reaction time parameters and anomaly detection, and train, using the labeled driving data, a machine-learning (ML) algorithm to generate one or more personalized ML models and a driver reaction time mapping. The one or more action engines are operable to generate personalized ADAS parameters based on the driver reaction time mapping. The one or more communication devices are operable to transmit the one or more personalized ML models and the personalized ADAS parameters to the vehicle for personalized real-time interference.

20 Claims, 6 Drawing Sheets

(52) U.S. Cl.
CPC . *B60W 2540/221* (2020.02); *B60W 2540/229* (2020.02); *B60W 2556/10* (2020.02); *B60W 2556/45* (2020.02)

(56) References Cited

U.S. PATENT DOCUMENTS

| | | | | |
|---|---|---|---|---|
| 10,636,291 | B1 | 4/2020 | Brinkmann et al. | |
| 10,843,625 | B2 | 11/2020 | Kapuria et al. | |
| 11,247,665 | B2 | 2/2022 | Limbacher | |
| 12,434,714 | B2 * | 10/2025 | Kuehnle | B60W 30/12 |
| 2010/0280726 | A1 * | 11/2010 | Stabrey | B60W 10/184 701/70 |
| 2019/0111933 | A1 * | 4/2019 | Schoeggl | B60W 60/0011 |
| 2021/0256846 | A1 * | 8/2021 | McErlean | G08G 1/096708 |
| 2023/0347876 | A1 | 11/2023 | Quint et al. | |
| 2023/0349704 | A1 | 11/2023 | Quint et al. | |
| 2024/0253643 | A1 * | 8/2024 | Ogawa | A61B 5/16 |
| 2024/0317241 | A1 * | 9/2024 | Ljungström | B60Q 9/00 |
| 2025/0178636 | A1 * | 6/2025 | Kum | B60W 60/001 |
| 2025/0353522 | A1 * | 11/2025 | Gupta | B60W 60/001 |

OTHER PUBLICATIONS

"Intelligent Personalized ADAS Warnings", Dec. 14, 2018, pp. 1-32, European Transport Research Review 10, Article No. 59, (https://etrr.springeropen.com/articles/10.1186/s12544-018-0324-6).

* cited by examiner

SYSTEMS AND METHODS FOR GENERATING PERSONALIZED ADVANCED DRIVER ASSISTANCE SYSTEMS

TECHNICAL FIELD

The present disclosure relates to systems and methods for vehicle driving assistance functions, more specifically, to systems and methods for vehicle driving assistance functions using cloud computing technologies.

BACKGROUND

Advanced Driver Assistance Systems (ADAS) face challenges due to the sheer volume of data generated by onboard sensors. Processing all this data directly within the vehicle can overwhelm its computational resources, potentially leading to delays in critical decision-making. Additionally, limitations in onboard storage capacity can restrict the vehicle system's ability to learn and adapt to individual driving styles and environments. Consequently, there is a need for a system and method for personalized ADAS using cloud computing technologies, which can offload processing tasks and store relevant data locally, enabling faster response times and tailored driver assistance features.

SUMMARY

In one embodiment, a system for generating personalized Advanced Driver Assistant Systems (ADAS) includes one or more processors, one or more action engines, and one or more communication devices. The one or more processors are operable to filter current driving data of a vehicle including environmental data and one or more driver states associated with a current driver, label the filtered driving data based on reaction time parameters and anomaly detection, and train, using the labeled driving data, a machine-learning (ML) algorithm to generate one or more personalized ML models and a driver reaction time mapping. The one or more action engines are operable to generate personalized ADAS parameters based on the driver reaction time mapping. The one or more communication devices are operable to transmit the one or more personalized ML models and the personalized ADAS parameters to the vehicle for personalized real-time interference.

In another embodiment, a method for generating personalized Advanced Driver Assistant Systems (ADAS), the method includes filtering current driving data of a vehicle including environmental data and one or more driver states associated with a current driver, labeling the filtered driving data based on reaction time parameters and anomaly detection, training, using the labeled driving data, a machine-learning (ML) algorithm to generate one or more personalized ML models and a driver reaction time mapping, generating personalized ADAS parameters based on the driver reaction time mapping, and transmitting the one or more personalized ML models and personalized ADAS parameters to the vehicle for personalized real-time interference.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
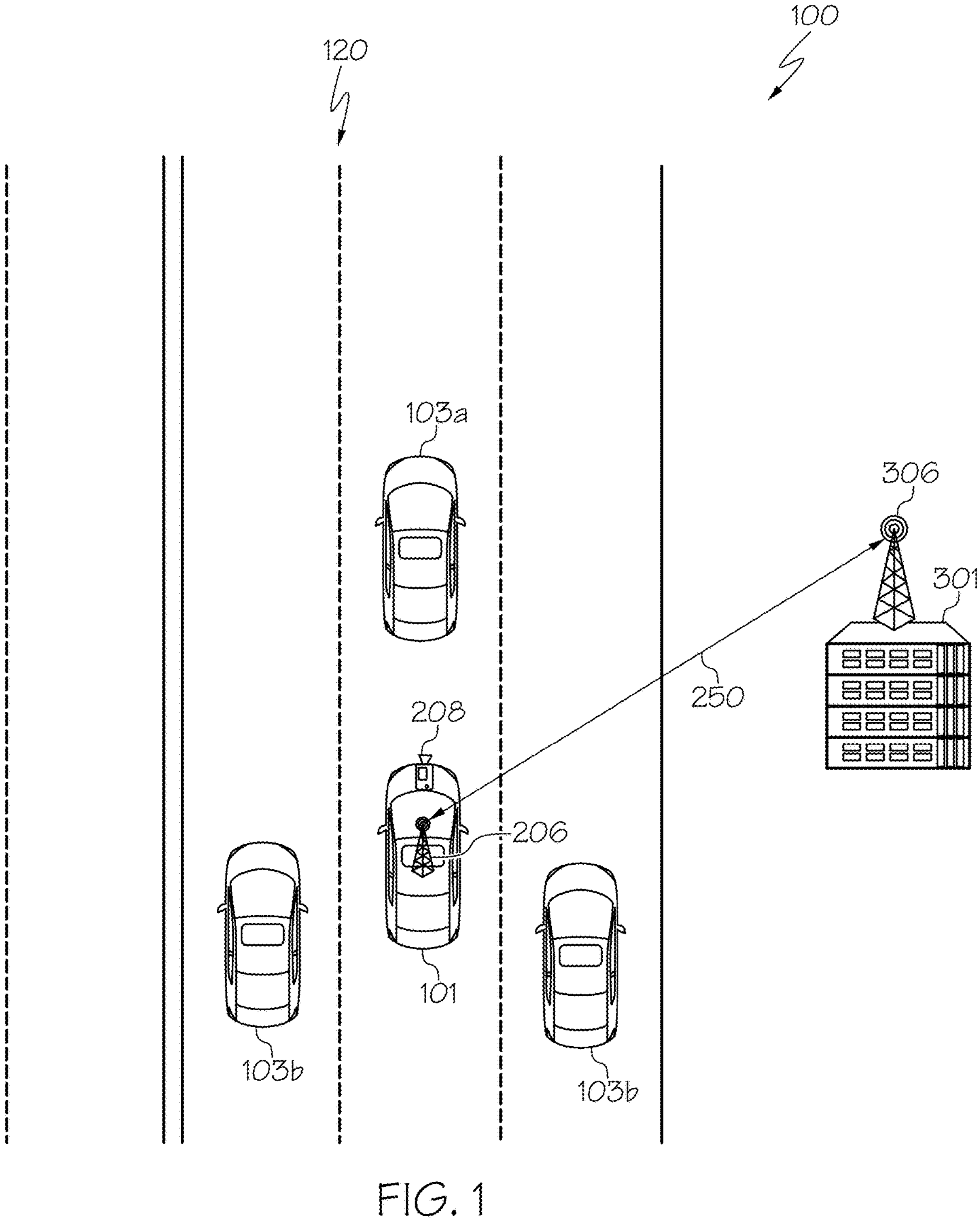
FIG. 1 schematically depicts an example system for generating personalized Advanced Driver Assistant Systems (ADAS) using a server for an ego vehicle of the present disclosure, according to one or more embodiments shown and described herewith.

This disclosure presents embodiments encompassing systems and methodologies tailored for generating personalized Advanced Driver Assistance Systems (ADAS) using one or more servers dedicated to the ego vehicle. These systems and methods enable the creation and updating of personalized reaction times for drivers, taking into account their individual states, traffic conditions, weather, and other relevant factors to enhance safety and comfort. By collecting and categorizing driver reaction times and constructing a driver reaction map for each individual, the disclosed systems facilitate adjustments to the ADAS settings through an action engine, thereby enhancing safety and comfort. Consequently, these systems and methods adapt the ADAS system according to changes in driver reaction times over time and adjust it based on evolving reaction times associated with varying driver states.

The reaction time of drivers refers to the duration it takes for them to perceive a hazard and respond to it by braking, steering, or taking other necessary actions. This reaction time is subject to change based on various driver states, such as fatigue, boredom, distraction, or stress. Typically, over extended periods of driving, reaction times tend to increase as drivers become fatigued, less alert, and less focused. Such changes can jeopardize both the driver's safety and that of others on the road. For instance, distractions, such as reading or sending text messages, can double a driver's reaction time. Driving under the influence of alcohol can slow reaction times by 15%-25%, with drivers at a 0.08% Blood Alcohol Concentration experiencing a delay of 120 milliseconds. Fatigue can increase reaction times by 16.72% from an alert state to a fatigued state. Additionally, various studies corroborate that tired drivers exhibit slower reaction times. Acute illnesses can also impair reaction times, especially concerning physical and cognitive capabilities. Furthermore, chronic stress and heightened anxiety levels can decelerate reaction times. Moreover, reaction times tend to elongate with age, as both physical and cognitive functions decline, leading to delayed responses to stimuli or road hazards. The disclosed systems and methods gather and classify driver reaction times alongside diverse driver states and environmental data to construct a personalized driver reaction map for each individual. This map is then utilized by an action engine to adjust settings within the ADAS system, thus generating personalized ADAS parameters. Various embodiments of the methods and systems for generating personalized ADAS using the server for the ego vehicle are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components unless the context clearly indicates otherwise.

Figure 4:
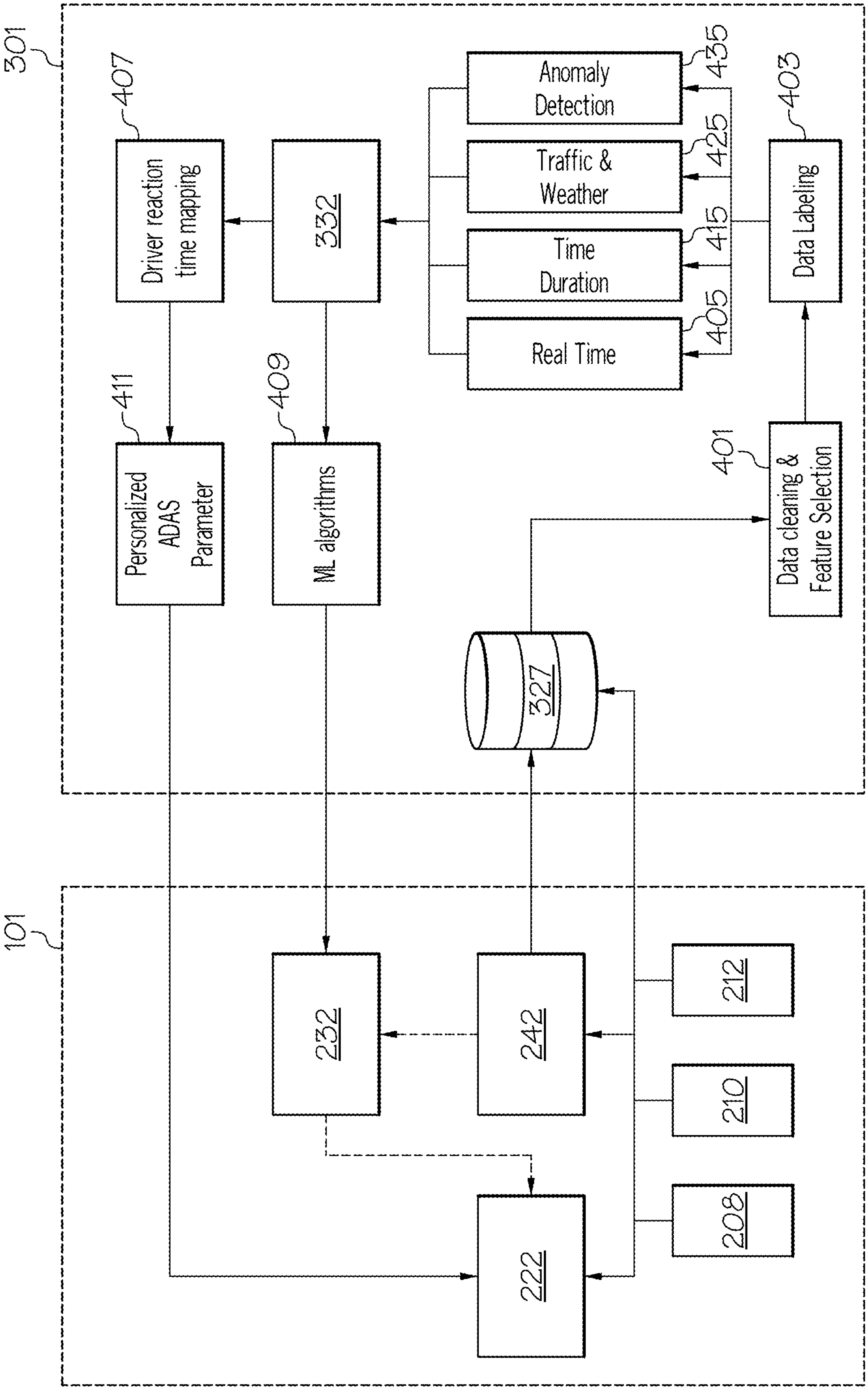
FIG. 4 depicts a flowchart for generating personalized ADAS using the server for the ego vehicle of the present disclosure, according to one or more embodiments shown and described herein.

Referring now to Figures, FIG. 1 schematically depicts an example personalized ADAS generation system 100. The personalized ADAS generation system 100 may collect, filter, and label current driving data, such as environmental data and driver stats of an current driver who is driving an ego vehicle 101, and train a machine-learning (ML) algorithm using the driving data to generate one or more personalized ML models 409 (as illustrated in FIG. 4) and a driver reaction time mapping 407 (as illustrated in FIG. 4). The personalized ADAS generation system 100 may further use one or more action engines to generate personalized ADAS parameters 411 (as illustrated in FIG. 4) based on the driver reaction time mapping 407. The ego vehicle 101 may then use the one or more personalized ML models 409 and the personalized ADAS parameters 411 for personalized real-time interference, such as updating gaps from adjacent vehicles, lane changing, updating vehicle speed, and updating warning time.

The personalized ADAS generation system 100 may include one or more of ego vehicles 101 and one or more servers 301. Each ego vehicle includes a communication device, such as vehicle network interface hardware 206, operable to wirelessly communicate with external computing resources, such as the server 301. The one or more servers 301 may include server communication devices, such as server network interface hardware 306, operable to communicate with the one or more ego vehicles 101.

In embodiments, each of the ego vehicles 101 may be an automobile or any other passenger or non-passenger vehicle such as, for example, a terrestrial, aquatic, and/or airborne vehicle. Each of the vehicles 101 may be an autonomous vehicle that navigates its environment with limited human input or without human input. Each of the ego vehicles 101 may drive on a road 120, where one or more non-ego vehicles 103, such as a lead vehicle 103*a*, one or more side vehicles 103*b* that are adjacent to the ego vehicle 101, may share the road 120 with the ego vehicle 101. Each of the vehicles 101 and 103 may include actuators for driving the vehicle, such as a motor, an engine, or any other powertrain. The vehicles 101 and 103 may move or appear on various surfaces, such as, without limitations, roads, highways, streets, expressways, bridges, tunnels, parking lots, garages, off-road trails, railroads, or any surfaces where the vehicles may operate.

Figure 2:
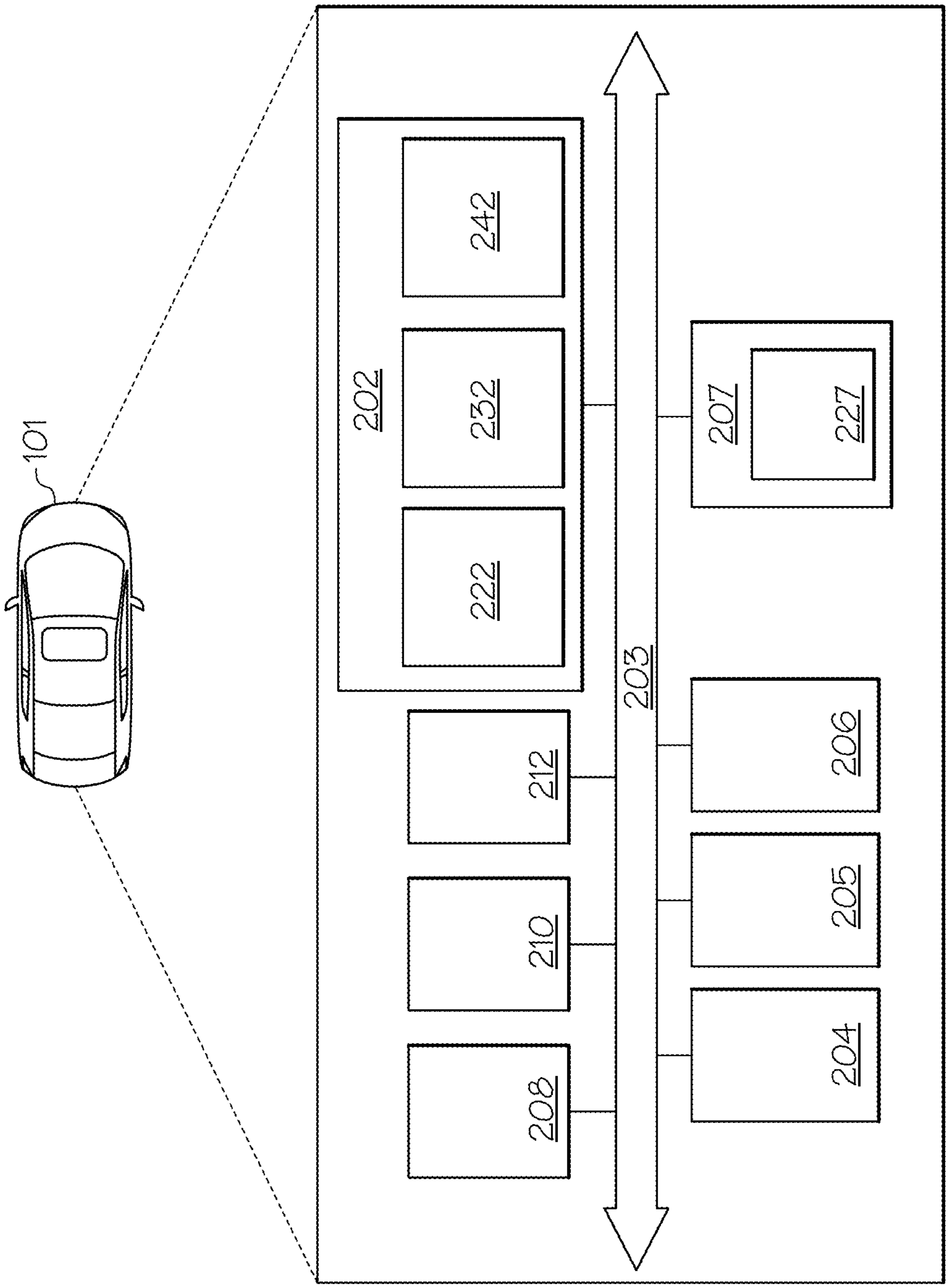
FIG. 2 schematically depicts example components of the ego vehicle of the present disclosure, according to one or more embodiments shown and described herein.

In embodiments, each of the ego vehicles 101 may include one or more proximity sensors 208, one or more user reaction sensors 210 (e.g., as illustrated in FIG. 2), and one or more vehicle steering sensors 212 (e.g., as illustrated in FIG. 2). The proximity sensors 208 and the vehicle steering sensors 212 may be used to collect and generate environmental data and vehicle steering data, such as a time gap and/or a distance between the ego vehicle 101 and the non-ego vehicles 103, such as the lead vehicle 103*a*, the acceleration of the ego vehicle 101, the velocity of the ego vehicle 101, and the velocity of the non-ego vehicle 103, current location of the ego vehicle 101, contextual information, such as weather information, a type of the road on which the ego vehicle 101 is driving, a surface condition of the road 120 on which the ego vehicle 101 is driving, and a degree of traffic on the road 120 on which the ego vehicle 101 is driving. The environmental data may include weather conditions (e.g., sunny, rain, snow, or fog), road conditions (e.g., dry, wet, or icy road surfaces), traffic conditions, road infrastructure, obstacles (e.g., non-ego vehicles 103 or pedestrians), lighting conditions, geographical features of the road 120, and other environmental conditions related to driving on the road 120.

In embodiments, the personalized ADAS generation system 100 may further include one or more user reaction sensors 210 (e.g., as illustrated in FIG. 2). The user reaction sensors 210 may include, without limitation, one or more of eye-tracking systems, electrocardiogram (ECS sensors), electromyography (EMG) sensors. In some embodiments, the personalized ADAS generation system 100 may use the one or more vehicle steering sensors 212 and/or the one or more user reaction sensors 210 to detect and determine a reaction time of the current user. For example, the personalized ADAS generation system 100 may use the vehicle steering sensors 212, such as mechanical sensors on the accelerator, brake, and clutch pedals, accelerometers, gyroscopes, and/or steering wheel angle sensor to measure the changes in vehicle dynamics as a function of time to further determine the user response to a stimulus, such as a sudden obstacle or a change in road conditions. The personalized ADAS generation system 100 may use the eye-tracking systems including cameras that monitor the user's eye movements and gaze patterns to determine the user's attention and reaction times. The personalized ADAS generation system 100 may use an ECS sensor to measure the user's heart rate variability or EMG sensors to detect user's muscle activity to determine physiological changes and muscle movements associated with stress or reaction to stimuli on the road 120.

In embodiments, the user reaction sensors 210 and/or one or more user interfaces may be used to collect and generate driver states associated with the current driver of the ego vehicle 101. The one or more driver states may include, without limitation, distractions (e.g., reading or sending text messages), intoxication, duration of driving, fatigue, acute illnesses, stress, and age of the current driver. For example, the personalized ADAS generation system 100 may use the eye-tracking systems to determine the current driver's level of distractions, intoxication, fatigue, or stress based on the current driver's pupil dilation, blink rate, gaze direction, and eye movement patterns. The personalized ADAS generation system 100 may receive input from users through the user interfaces, such as users' age, driving experience level, level of intoxication, fatigue, or stress.

In embodiments, each ego vehicle 101 may include an ADAS system. The ADAS system may include various safety features and technologies designed to assist users in operating the ego vehicles 101. The ADAS systems may use various sensors, such as the one or more proximity sensors 208, and other technologies to detect undesirable hazards on the road 120 and provide warnings or take corrective actions to prevent accidents and/or undesirable user experiences.

In some embodiments, the ADAS may include subsystems, such as, without limitation, Pre-Collision System (PCS) and Automatic Emergency Braking to warn the user of an imminent collision with another non-ego vehicle 103 and/or obstacle and automatically operate the ego vehicle 101 to prevent or mitigate any undesirable impact, Adaptive Cruise Control to automatically adjust the speed of the ego vehicle 101 to maintain a desirable distance from the lead vehicle 103*a*, Lane Departure Warning and Lane Keeping Assist to alerts the user if the ego vehicle 101 drifts out of its lane and/or apply corrective steering to keep the ego vehicle 101 within the lane, Blind Spot Monitoring and Rear Cross Traffic Alert to alerts the user of the non-ego vehicle 103 or pedestrians in the blind spot area and/or in the rearview of a parking space or driveway, Parking Assistance to assist the user in parking maneuvers by automatically steering or braking. Each ego vehicle 101 may include an onboard ADAS module 222 (e.g., as illustrated in FIG. 2) to operate an ADAS system. In some embodiments, each ego vehicle 101 may further include one or more onboard personalized ML models operated by an onboard ML module 232 (e.g., as illustrated in FIG. 2) to tune the ADAS system.

In embodiments, each ego vehicle 101 may send a request of personalized ADAS generation to the one or more servers 301 regarding generating personalized ADAS. Each of the ego vehicle 101 may include a vehicle network interface hardware 206 and communicate with the server 301 via wireless communications 250. The ego vehicle 101 may transmit, without limitations, environmental data, sensory data, real-time driver reaction time, and one or more driver states associated with a current driver. In some embodiments, the ego vehicle 101 may communicate with the server 301 using a smartphone, a computer, a tablet, or a digital device that requires data processing.

In embodiments, the one or more servers 301 may be devices and/or servers remotely connected to the ego vehicles 101. The one or more servers 301 may include, without limitation, one or more of cloud servers, smartphones, tablets, telematics servers, fleet management servers, connected car platforms, application servers, Internet of Things (IoTs) servers, or any server with the capability to transmit data with vehicles. Each server 301 may include server network interface hardware 306 and communicate with the ego vehicles 101 and other servers 301 via wireless communications 250. Each server 301 may include an action engine module 322, an ML training module 332, and a driving data processing module 342.

The wireless communication 250 may connect various components, the vehicles 101 and the server 301 of the personalized ADAS generation system 100, and allow signal transmission between the various components, the vehicles, and/or the server 301 of the personalized ADAS generation system 100. In one embodiment, the wireless communications 250 may include one or more computer networks (e.g., a personal area network, a local area network, or a wide area network), cellular networks, satellite networks and/or a global positioning system and combinations thereof. Accordingly, the ego vehicles 101 and the servers 301 can be communicatively coupled to the wireless communications 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near-field communication protocols. Suitable cellular networks include, but are not limited to, technologies such as LTE, WiMAX, UMTS, CDMA, and GSM.

Figure 3:
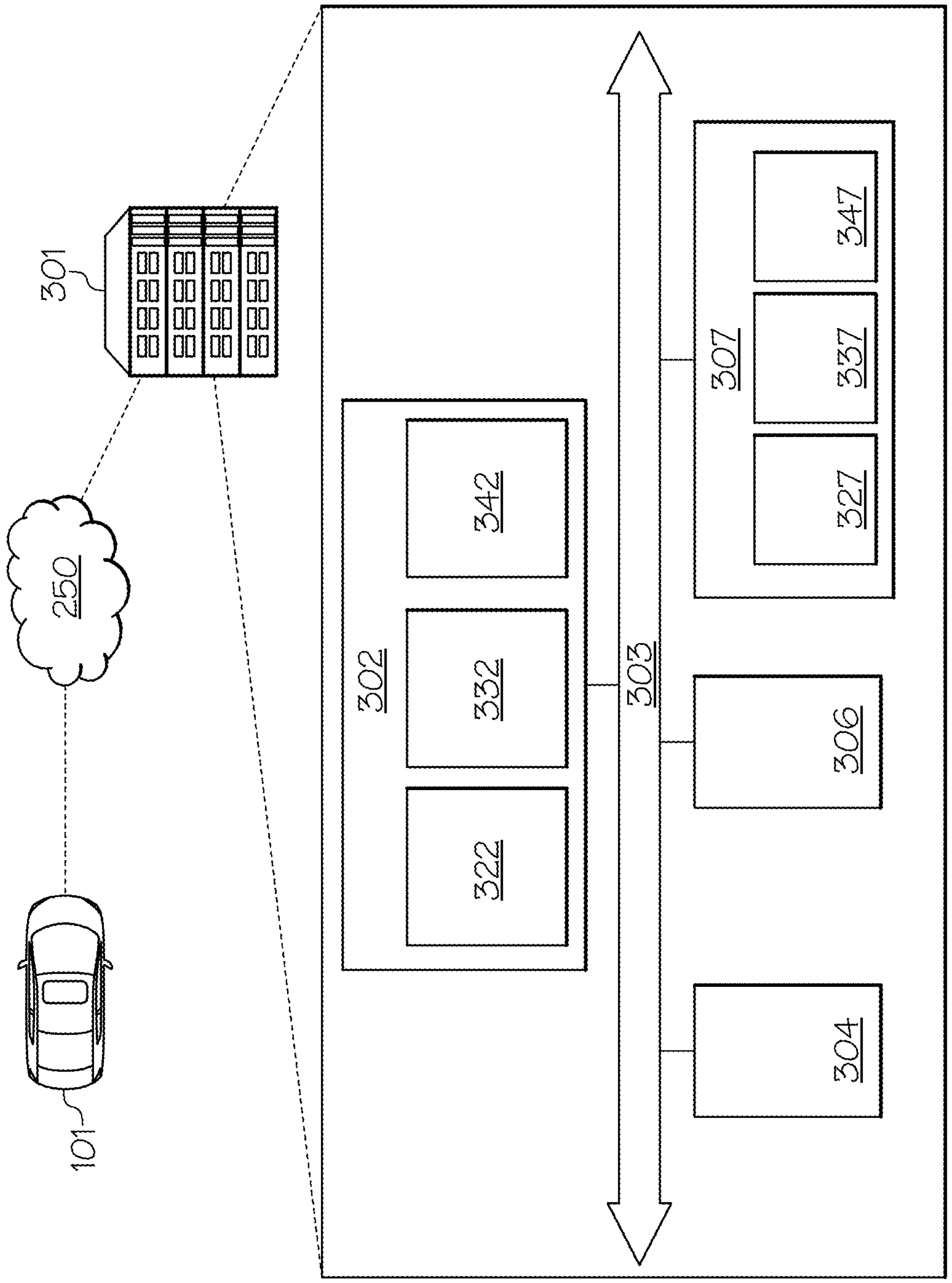
FIG. 3 schematically depicts example components of the server of the present disclosure, according to one or more embodiments shown and described herein.

FIGS. 2 and 3 schematically depict example components of the personalized ADAS generation system 100. The personalized ADAS generation system 100 may include the one or more ego vehicles 101 and the one or more servers 301. While FIG. 2 depicts one ego vehicle 101, more than two ego vehicles 101 may be included in the personalized ADAS generation system 100. Similarly, while FIG. 3 depicts one ego vehicle 101 and one server 301, more than two ego vehicles 101 or more than two servers 301 may communicate with each other.

Referring to FIG. 2, the ego vehicle 101 may include one or more processors 204. Each of the one or more processors 204 may be any device capable of executing machine-readable and executable instructions. The instructions may be in the form of a machine-readable instruction set stored in data storage component 207 and/or the memory component 202. Accordingly, each of the one or more processors 204 may be a controller, an integrated circuit, a microchip, a computer, or any other computing device. The one or more processors 204 are coupled to a communication path 203 that provides signal interconnectivity between various modules of the system. Accordingly, the communication path 203 may communicatively couple any number of processors 204 with one another, and allow the modules coupled to the communication path 203 to operate in a distributed computing environment. Specifically, each of the modules may operate as a node that may send and/or receive data. As used herein, the term "communicatively coupled" means that coupled components are capable of exchanging data signals with one another such as, for example, electrical signals via a conductive medium, electromagnetic signals via air, optical signals via optical waveguides, and the like.

Accordingly, the communication path 203 may be formed from any medium that is capable of transmitting a signal such as, for example, conductive wires, conductive traces, optical waveguides, or the like. In some embodiments, the communication path 203 may facilitate the transmission of wireless signals, such as WiFi, Bluetooth®, Near Field Communication (NFC), and the like. Moreover, the communication path 203 may be formed from a combination of mediums capable of transmitting signals. In one embodiment, the communication path 203 comprises a combination of conductive traces, conductive wires, connectors, and buses that cooperate to permit the transmission of electrical data signals to components such as processors, memories, sensors, input devices, output devices, and communication devices. Accordingly, the communication path 203 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal wave, triangular wave, square-wave, vibration, and the like, capable of traveling through a medium.

The ego vehicle 101 may include one or more memory components 202 coupled to the communication path 203. The one or more memory components 202 may comprise RAM, ROM, flash memories, hard drives, or any device capable of storing machine-readable and executable instructions such that the machine-readable and executable instructions can be accessed by the one or more processors 204. The machine-readable and executable instructions may comprise one or more logic or algorithms written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored on the one or more memory components 202. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 204 along with the one or more memory components 202 may operate as a controller or an electronic control unit (ECU) for the ego vehicle 101.

The one or more memory components 202 may include the onboard ADAS module 222, the onboard ML module 232, and the user reaction module 242. The data storage component 207 stores historical ADAS parameters 227, and data of operating ego vehicles 101. The historical ADAS parameters may include historical parameters regarding gap, lane change, and warning time.

The ego vehicle 101 may include the input/output hardware 205, such as, without limitations, a monitor, keyboard, mouse, printer, camera, microphone, speaker, and/or other device for receiving, sending, and/or presenting data. The input/output hardware 205 may include a user interface allowing the user to input or control the personalized ADAS generation system 100 regarding the inquiry for personalized ADAS generation.

The ego vehicle 101 may include network interface hardware 206 for communicatively coupling the ego vehicle 101 to one or more servers 301. The network interface hardware 206 can be communicatively coupled to the communication path 203 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 206 includes hardware configured to operate in accordance with the Bluetooth® wireless communication protocol. The network interface hardware 206 of the ego vehicle 101 may transmit its data to the server 301. For example, the network interface hardware 206 of the ego vehicle 101 may transmit inquiry tasks, negotiation prices, bidding contract information, and receive bid information and task performance results, and relevant data, such as, without limitation, vehicle data, location data, updated local model data and the like to and from the server 301.

The ego vehicles 101 may include one or more proximity sensors 208 and vehicle steering sensors 212. The proximity sensors 208 may be used for capturing the images or videos of the environment around the ego vehicles 101. In some embodiments, the one or more proximity sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain rough depth and speed information for the view of the ego vehicle 101. The one or more proximity sensors 208 may include a forward facing camera installed in the vehicles 101. The one or more proximity sensors 208 may be any device having an array of sensing devices capable of detecting radiation in an ultraviolet wavelength band, a visible light wavelength band, or an infrared wavelength band. The one or more proximity sensors 208 may have any resolution. In some embodiments, one or more optical components, such as a mirror, fish-eye lens, or any other type of lens may be optically coupled to the one or more proximity sensors 208. In embodiments described herein, the one or more proximity sensors 208 may provide image data to the one or more processors 204 or another component communicatively coupled to the communication path 203. In some embodiments, the one or more proximity sensors 208 may also provide navigation support. That is, data captured by the one or more proximity sensors 208 may be used to autonomously or semi-autonomously navigate a vehicle.

The ego vehicles 101 may include one or more vehicle steering sensors 212. Each of the one or more vehicle steering sensors 212 is coupled to the communication path 203 and communicatively coupled to the one or more processors 204. The one or more vehicle steering sensors 212 may include one or more speed sensors or motion sensors for detecting and measuring motion and changes in motion of a vehicle, e.g., the vehicle 101. The motion sensors may include inertial measurement units. Each of the one or more motion sensors may include one or more accelerometers and one or more gyroscopes. Each of the one or more motion sensors transforms the sensed physical movement of the vehicle into a signal indicative of an orientation, a rotation, a velocity, or an acceleration of the vehicle. The acquired data from the vehicle steering sensors 212 may be used to determine the vehicle kinematics of the ego vehicles 101. Accordingly, the vehicle steering sensors 212 may be used to collect and generate vehicle control data and vehicle kinematic data. The vehicle control data may include throttle position, brake status, steering angle, and gear selection. The vehicle kinematic data may include velocity, acceleration, position, and orientation.

Each of the vehicle modules and the server modules may include one or more machine learning algorithms. The vehicle modules and the server modules may be trained and provided with machine-learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (Sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In ML applications, new inputs may be provided (such as the generated one or more outputs) to the ANN model as training data to continue to improve accuracy and minimize error of the ANN model. The one or more ANN models may utilize one-to-one, one-to-many, many-to-one, and/or many-to-many (e.g., sequence-to-sequence) sequence modeling. The one or more ANN models may employ a combination of artificial intelligence techniques, such as, but not limited to, Deep Learning, Random Forest Classifiers, Feature extraction from audio, images, clustering algorithms, or combinations thereof. In some embodiments, a convolutional neural network (CNN) may be utilized. For example, a convolutional neural network (CNN) may be used as an ANN that, in the field of machine learning, for example, is a class of deep, feed-forward ANNs applied for audio analysis of the recordings. CNNs may be shift or space-invariant and utilize shared-weight architecture and translation. Further, each of the various modules may include a generative artificial intelligence algorithm. The generative artificial intelligence algorithm may include a general adversarial network (GAN) that has two networks, a generator model and a discriminator model. The generative artificial intelligence algorithm may also be based on variation autoencoder (VAE) or transformer-based models.

Referring to FIG. 3, the server 301 includes one or more processors 304, one or more memory components 302, data storage component 307, server network interface hardware 306, and a local interface 303. The one or more processors 304 may be a controller, an integrated circuit, a microchip, a computer, or any other computing device. The one or more memory components 302 may comprise RAM, ROM, flash memories, hard drives, or any device capable of storing machine-readable and executable instructions such that the machine-readable and executable instructions can be accessed by the one or more processors 304. The one or more memory components 302 may include the action engine module 322, the ML training module 332, and the driving data processing module 342. The data storage component 307 stores data lake 327, historical personalized ADAS parameters 337, and historical ML models 347.

FIG. 4 depicts a flowchart of example generation of personalized ADAS using the server 301 for the ego vehicle 101 of the present disclosure. The personalized ADAS generation system 100 may detect a current driver as the user operating the ego vehicle 101. The ego vehicle 101 may continuously collect driver data and transmit the driver data to the server 301. The driver data may include the environmental data and one or more driver states associated with the current driver. For example, the driver data may include the current driver's age (e.g., classifying the current driver as a teen driver, a senior driver, or a regular driver, etc.), distractions to the current driver, one or more other driver states (e.g., under influence, fatigue, acute illness, stress, etc.), and environmental data (e.g., traffic, weather, and other conditions).

In embodiments, the personalized ADAS generation system 100 may collect the environmental data using external sensors (e.g., from non-ego vehicles 103) and various onboard sensors of the ego vehicle 101, such as the one or more proximity sensors 208, the one or more user reaction sensors 210, and the one or more vehicle steering sensors 212 to collect sensory data. The personalized ADAS generation system 100 may generate environmental data based on the sensory data regarding the ego vehicle maneuvering and the vehicle environment information. The ego vehicle 101 may feed the generated sensory data to the onboard ADAS module 222. The user reaction module 242 may generate driver states and real-time user reaction time based on the sensory data regarding the user operation of the ego vehicle 101 and reaction to environment around the ego vehicle 101.

In embodiments, the personalized ADAS generation system 100 may transmit the environmental data, the driver states, and the real-time user reaction time to the server 301 through the wireless communications 250 (e.g., as illustrated in FIGS. 1 and 3). The server 301 may feed the received data including the environmental data, the driver states, and the real-time user reaction time from the ego vehicle 101 to the data lake 327. The driving data processing module 342 may compare the received data with historical data in the data lake 327. For example, the driving data processing module 342 may compare the received data with the historical environmental data, historical driver states, and historical user reaction time associated with the current driver. In another example, the driving data processing module 342 may compare the received data with environmental data, driver states, and user reaction time of other similar users in terms of driver states, such as, user's age, stress level, intoxication level, distraction level, fatigue level, duration of driving, and perform data filtering 401. The comparison allows the driving data processing module 342 conduct data filtering 401. The data filtering 401 may include data cleaning and feature selection. Through the data cleaning and the feature selection, the driving data processing module 342 may remove noisy or irrelevant information and identify desirable features to assess the current driver's driver state and influence the reaction time of the current driver, such as level of distractions, intoxication, fatigue, or stress, and associated the driver states with the environmental data and the driver reaction time. After filtering 401, the driving data processing module 342 may further conduct data labeling 403 to label the filtered driver data in different categories, such as, real time driver reaction time, changes of reaction time over the duration of the drive by the driver, context information associated with the reaction time (e.g., weather and traffic), and whether anomaly events are detected. Accordingly, the driving data processing module 342 may label the filtered driver data with various labels, such as, without limitation, a real time reaction time label 405, a time duration label 415 regarding the duration of the drive, a context label 425 regarding environmental information, and an anomaly detection label 435. The labeled driver data may be then fed to the ML training module 332 for training.

In embodiments, the ML training module 332 may use one or more neural networks to train a ML algorithm to generate driver reaction time mapping 407 and one or more personalized ML models 409 for generating driver reaction time based on input data including the environmental data and the driver states. The neural networks may include an encoder or/and a decoder conjunct with a layer normalization operation or/and an activation function operation. The encoded input data may be normalized and weighted through the activation function before being fed to the hidden layers. The hidden layers may generate a representation of the input data at a bottleneck layer. After delivering neural-network processed data to the final layer of the neural network, a global layer normalization may be conducted to normalize the output, such as predicted driver reaction time. The outputs may be normalized and converted using an activation function for training and verification purposes, as described in detail further below. The activation function may be linear or nonlinear. The activation function may be, without limitations, a Sigmoid function, a Softmax function, a hyperbolic tangent function (Tanh), or a rectified linear unit (ReLU). The neural networks may feed the encoder with historical data from the data lake 327 and the historical ML models 347. For example, the ML training module 332 may train the ML algorithm using historical driving data associated with the current driver in past driving trips, and/or driving data associated with drivers other than the current driver. The one or more neural networks may use regression techniques as described herein. The labeled driver data may be fed to the neural network and the generated personalized ML models 409 may be validated using the real-time reaction time sent from the ego vehicle 101, the historical user reaction time associated with the current driver, and the user reaction time associated with other similar users. The validation process may include cross-validation.

Figure 5:
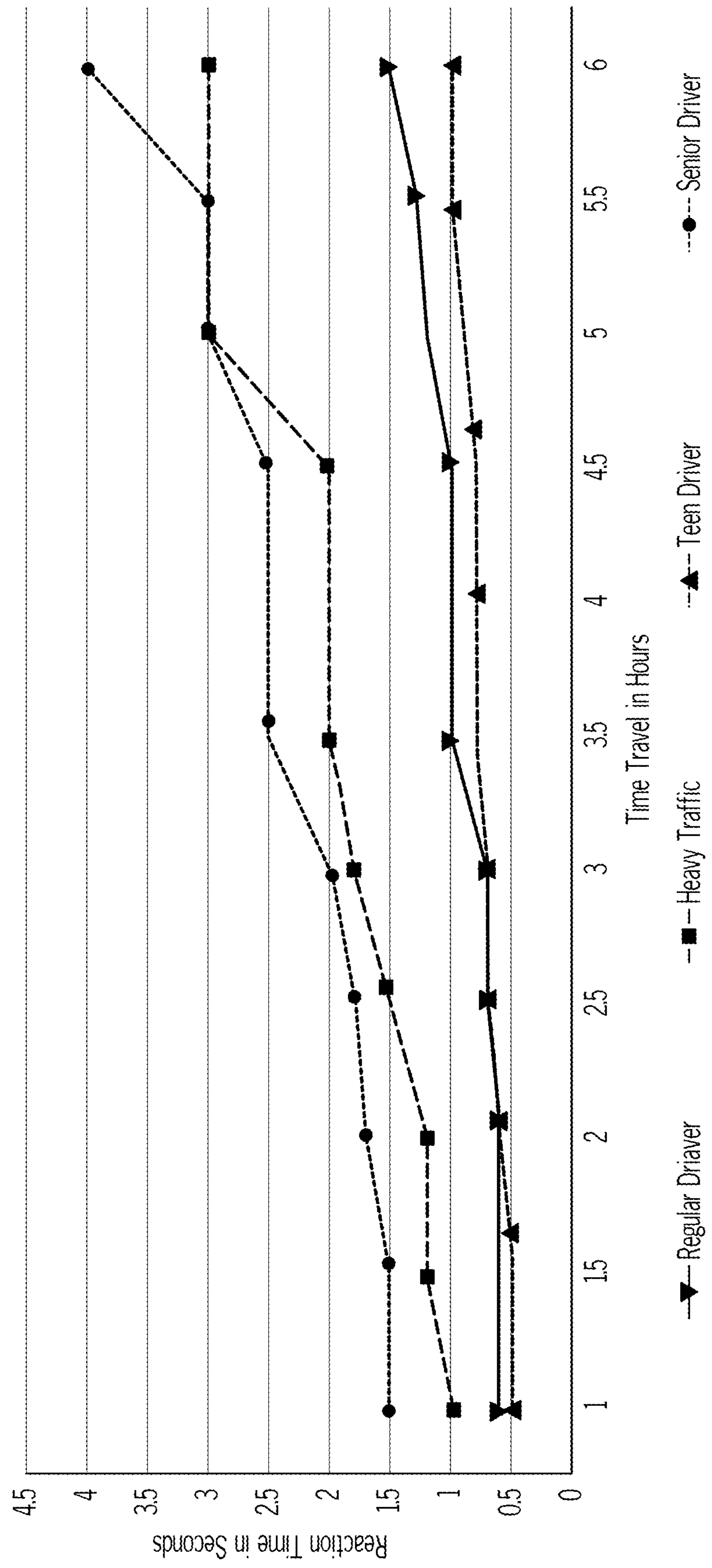
FIG. 5 depicts an example plot of reaction time according to time travel for different driver types and driving conditions of the present disclosure, according to one or more embodiments shown and described herein.

In embodiments, the driver reaction time mapping 407 may be generated by the ML training module 332 based on the labeled driver data. The driver reaction time mapping 407 may include the predicted reaction time of the current driver when driving the ego vehicle 101 according to the environment and driver conditions, such as one or more passengers seated in the ego vehicle 101, the current driver being hungry, the current driver's mental state (such as stress level), whether the vehicle is driving in a familiar or unfamiliar area. Some of the driver reaction time mappings 407 may be predicted based on the historical ML models 347 and data lake 327. The driver reaction time mapping 407 may correlate the reaction times of the current driver with a plurality of driving events and respective driver states during the driving events. The driving events may include, without limitation, driving events comprise lane changes, acceleration, deceleration, turning, merging, braking, gap adjustment, distracted driving (e.g., by the phone, passengers, or external factors), and road conditions (e.g., heavy traffic, pedestrian crossings, traffic signal changes, avoiding collisions, slippery road conditions, animal crossings). For example, as illustrated in FIG. 5, reaction time changes according to types of drivers (e.g., teens, regular drivers, seniors), and driving events (e.g., heavy traffic may cause stress) and driving duration. The complexity of the relationship between reaction time and the multifactor influence factors may lead to a high-dimensional driver reaction time mapping 407 and provides a comprehensive predictability of reaction time in various environment and driving circumstances. The personalized ADAS generation system 100 may continuously monitor the change in driver states of the current driver due to traffic, weather, duration of driving, stress, and intoxication, and create/update the driver reaction time mapping 407.

In embodiments, the generated/updated driver reaction time mapping 407 may be fed into the action engine module 322 to generate personalized ADAS parameters 411, such as, for example, gap to the neighboring vehicles (e.g., the lead vehicle 103*a*, the side vehicles 103*b* in FIG. 1), lane change, and warning time before potential collision. The generated personalized ADAS parameters 411 may be further transmitted to the ego vehicle 101 for real-time interference through the various subsystems of the ADAS as described herein. For example, the ego vehicle may perform personalized real-time interference, such as updating gaps from adjacent vehicles (e.g., the lead vehicle 103*a*, the side vehicles 103*b*), assisting lane changing, updating speed of the ego vehicle 101, and updating warning time for obstacles, collisions, and pedestrians.

In some embodiments, the action engine module 322 may generate personalized ADAS parameters 411 based on the vehicle models and vehicle conditions of the ego vehicle 101. For example, everything being equal, a high-end vehicle may have a small gap to the lead vehicle 103*a*, and an aging (e.g., 10-year-old) vehicle may have a greater warning time value in the PCS (i.e., earlier warning) before a potential collision.

In embodiments, the generated personalized ML models 409 through the ML algorithm training may be transmitted to the ego vehicle 101 for real-time interference. The ego vehicle 101 may use the personalized ML models 409 to learn the various events and the meaning behind the events, such as traffic events, driver states, etc. The ego vehicle 101 may use the one or more personalized ML models 409 and the personalized ADAS parameters 411 generated by the server 301 to further update the onboard personalized ADAS parameters based on real-time driving data that includes a real-time driver state of the current driver and real-time driving events of the ego vehicle 101. For example, the ego vehicle 101 may further use the onboard ML module 232 to predict real-time driver reaction time when the current driver uses the ego vehicle 101. The predicted real-time driver reaction time may be fed to the onboard ML module 232 to adjust the ADAS parameters, for example, increasing/decreasing gap from lead vehicle 103*a*, changing lanes, changing driving speeds, warning time to PCS system (e.g., how early/late to notify the current driver of potential collision).

In some embodiments, the one or more server modules, such as the action engine module 322, the ML training module 332, and the driving data processing module 342, may be pre-trained using training data, including ground-truth examples and scenarios where multiple entities (e.g., the ego vehicles 101 and the non-ego vehicles 103) driving on a shared surface, such as road 120, at different road conditions, traffic conditions, and weather conditions, and the example driver may exhibit various driver states and driver reaction time. The pre-training may include labeling the entities, the example driver states, and desirable driver reaction time based on the entities, the example drivers, and the environmental data in the examples and scenarios and using one or more neural networks to learn to predict the desirable and undesirable driver reaction time, driver reaction time mappings 407, and personalized ML models 409 based on the training data.

The pre-training may further include fine tuning, evaluation, and testing steps. The modules may be continuously trained using the real-world collected data stored in the data lake 327 and historical ML models 347 to adapt to changing conditions and factors and improve the performance over time. For example, the neural network may be trained based on the activation functions mentioned further above. The encoder may generate encoded input data h=(Wx+b) that is transformed from the input data of one or more input channels. The encoded input data of one of the input channels may be represented as $h_{ij}=g(Wx_{ij}+b)$ from the raw input data $x_{ij}$, which is then used to reconstruct output $\tilde{x}_{ij}=f(W^T h_{ij}+b')$. The neural networks may reconstruct outputs, such as driver reaction time mappings 407, and personalized ML models 409, into $x'=(W^T h+b')$, where W is weight, b is bias, $W^T$ and b' are transverse values of W and b and are learned through backpropagation. In this operation, the neural networks may calculate, for each input data, a distance between an input data x and a reconstructed input data x', to yield a distance vector $|x-x'|$. The neural networks may minimize the loss function which is a utility function as the sum of all distance vectors. The training process may enable the neural network to learn linear or non-linear representations of the input data.

The accuracy of the predicted output may be evaluated by satisfying a preset value, such as a preset accuracy and area under the curve (AUC) value computed using an output score from the activation function (e.g., the Softmax function or the Sigmoid function). For example, the personalized ADAS generation system 100 may assign the preset value of the AUC with the value of 0.7 to 0.8 as an acceptable simulation, 0.8 to 0.9 is as an excellent simulation, or more than 0.9 as an outstanding simulation. After the training satisfies the preset value, the updated neural networks may be stored in the action engine module 322, the ML training module 332, and the driving data processing module 342, which are used for future personalized ADAS generation.

The action engine module 322, the ML training module 332, and the driving data processing module 342 may be continuously trained using the real-world collected data to adapt to changing conditions and factors and improve performance over time. For example, the ML training module 332 may incrementally update the one or more personalized ML models 409 and the personalized ADAS parameters 411 by continuously collecting ongoing environmental data and ongoing driving states of the current driver.

Figure 6:
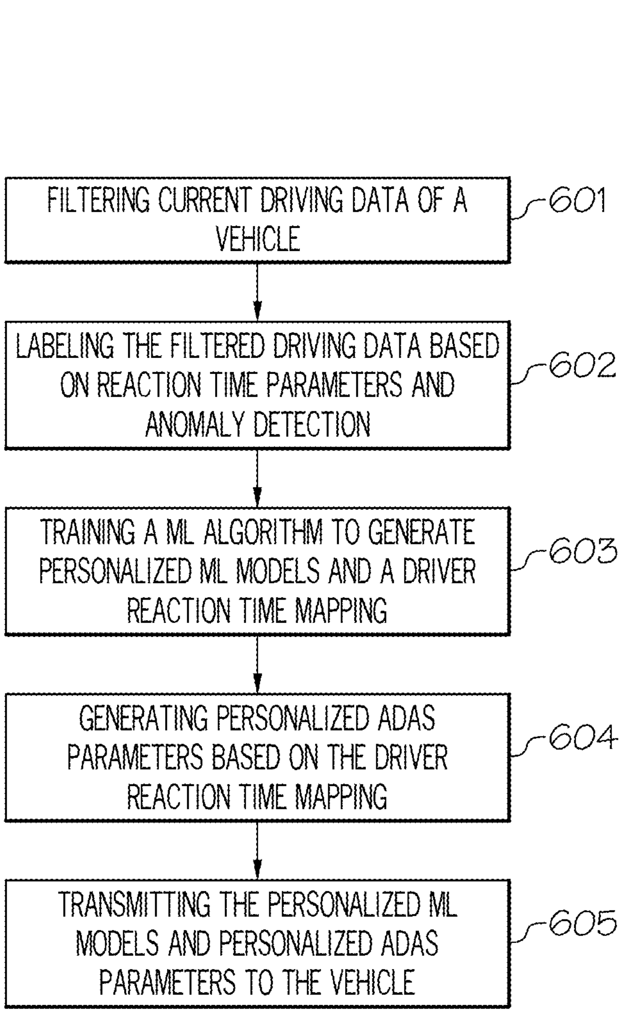
FIG. 6 depicts a flowchart for generating personalized ADAS using the server for the ego vehicle of the present disclosure, according to one or more embodiments shown and described herein.

FIG. 6 depicts a flowchart for illustrative steps for the method 600 of generating personalized ADAS of the present disclosure. At block 601, the present method 600 may include filtering the current driving data of a vehicle including environmental data and one or more driver states associated with a current driver. At block 602, the present method 600 may include labeling the filtered driving data based on reaction time parameters and anomaly detection. At block 603, the present method 600 may include training, using the labeled driving data, a ML algorithm to generate one or more personalized ML models 409 and a driver reaction time mapping 407. At block 604, the present method 600 may include generating personalized ADAS parameters 411 based on the driver reaction time mapping 407. At block 605, the present method 600 may include transmitting the one or more personalized ML models and personalized ADAS parameters 411 to the ego vehicle 101 for personalized real-time interference.

In some embodiments, the driver reaction time mapping 407 may include, without limitation, correlating reaction times of the current driver with a plurality of driving events and respective driver states during the driving events. The driving events may include, without limitation, lane changes, acceleration, deceleration, turning, merging, braking, and gap adjustment. The filtering 401 of the current driving data of the ego vehicle 101 may include, without limitation, data cleaning and feature selection.

In some embodiments, the one or more driver states may include, without limitation, distractions, intoxication, duration of driving, fatigue, acute illnesses, stress, and age of the current driver. The reaction time parameters may include, without limitation, reaction time, time duration, and traffic and weather.

In some embodiments, the present method 600 may further include updating the personalized ADAS parameters 411 based on real-time driving data comprising a real-time driver state of the current driver and real-time driving events of the ego vehicle 101. The personalized ADAS parameters 411 may be generated further based on the vehicle models and vehicle conditions of the ego vehicle 101.

In some embodiments, the personalized real-time interference may include updating gaps from adjacent vehicles (e.g., the lead vehicle 103*a*, the side vehicles 103*b*), assisting lane changing, updating vehicle speed, and updating warning time for obstacles, collisions, and pedestrians.

In some embodiments, the present method 600 may further include training the ML model using historical driving data associated with the current driver in past driving trips and/or driving data associated with drivers other than the current driver, and incrementally updating the one or more personalized ML models 409 and the personalized ADAS parameters 411 by continuously collecting ongoing environmental data and ongoing driving states of the current driver.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for generating personalized Advanced Driver Assistant Systems (ADAS) comprising:

one or more processors operable to:

filter current driving data received from a vehicle comprising environmental data and one or more driver states associated with a current driver, wherein the vehicle is remote from the one or more processors;

label the filtered driving data based on reaction time parameters and anomaly detection; and train, using the labeled driving data, a machine-learning (ML) algorithm to generate one or more personalized ML models and a driver reaction time mapping;

one or more action engines operable to generate personalized ADAS parameters based on the driver reaction time mapping; and one or more communication devices operable to transmit the one or more personalized ML models and the personalized ADAS parameters to the vehicle for personalized real-time interference, wherein the one or more personalized ML models are configured to be used by the vehicle to further update onboard personalized ADAS parameters based on real-time driving data.

2. The system of claim 1, wherein the driver reaction time mapping comprises correlating reaction times of the current driver with a plurality of driving events and respective driver states during the driving events, and the driving events comprise lane changes, acceleration, deceleration, turning, merging, braking, and gap adjustment.

3. The system of claim 1, wherein the one or more driver states comprise duration of driving, or age of the current driver.

4. The system of claim 1, wherein the one or more driver states comprise distractions, intoxication, fatigue, acute illnesses, or stress.

5. The system of claim 1, wherein the one or more personalized ML models and the personalized ADAS parameters are operable to update the personalized ADAS parameters based on real-time driving data comprising a real-time driver state of the current driver and real-time driving events of the vehicle.

6. The system of claim 1, wherein the personalized real-time interference comprises updating gaps from adjacent vehicles, assisting lane changing, updating vehicle speed, and updating warning time for obstacles, collisions, and pedestrians.

7. The system of claim 1, wherein the filtering the current driving data comprises data cleaning and feature selection.

8. The system of claim 1, wherein the reaction time parameters comprise reaction time, time duration, and traffic and weather.

9. The system of claim 1, wherein the one or more action engines are operable to generate the personalized ADAS parameters further based on vehicle model and vehicle conditions of the vehicle.

10. The system of claim 1, wherein the one or more personalized ML models and the personalized ADAS parameters are incrementally updated by continuously collecting ongoing environmental data and ongoing driving states of the current driver.

11. The system of claim 1, wherein the one or more processors are operable to train the ML algorithm, further using historical driving data associated with the current driver in past driving trips.

12. The system of claim 1, wherein the one or more processors are operable to train the ML algorithm, further using driving data associated with drivers other than the current driver.

13. A method for generating personalized Advanced Driver Assistant Systems (ADAS), the method comprising:

filtering current driving data received from a vehicle comprising environmental data and one or more driver states associated with a current driver;

labeling the filtered driving data based on reaction time parameters and anomaly detection;

training, by one or more processors remote from the vehicle and using the labeled driving data, a machine-learning (ML) algorithm to generate one or more personalized ML models and a driver reaction time mapping;

generating, by one or more processors remote from the vehicle, personalized ADAS parameters based on the driver reaction time mapping; and transmitting the one or more personalized ML models and personalized ADAS parameters to the vehicle for personalized real-time interference, wherein the one or more personalized ML models are configured to be used by the vehicle to further update onboard personalized ADAS parameters based on real-time driving data.

14. The method of claim 13, wherein the driver reaction time mapping comprises correlating reaction times of the current driver with a plurality of driving events and respective driver states during the driving events, the driving events comprising lane changes, acceleration, deceleration, turning, merging, braking, and gap adjustment.

15. The method of claim 13, wherein the filtering the current driving data of the vehicle comprises data cleaning and feature selection.

16. The method of claim 13, wherein the one or more driver states comprise distractions, intoxication, duration of driving, fatigue, acute illnesses, stress, or age of the current driver; and the reaction time parameters comprise reaction time, time duration, and traffic and weather.

17. The method of claim 13, wherein the method further comprises updating the personalized ADAS parameters based on real-time driving data comprising a real-time driver state of the current driver and real-time driving events of the vehicle.

18. The method of claim 13, wherein the personalized real-time interference comprises updating gaps from adjacent vehicles, assisting lane changing, updating vehicle speed, and updating warning time for obstacles, collisions, and pedestrians.

19. The method of claim 13, wherein the personalized ADAS parameters are generated further based on vehicle model and vehicle conditions of the vehicle.

20. The method of claim 13, wherein the method further comprises:

training the ML algorithm using historical driving data associated with the current driver in past driving trips and driving data associated with drivers other than the current driver; and incrementally updating the one or more personalized ML models and the personalized ADAS parameters by continuously collecting ongoing environmental data and ongoing driving states of the current driver.

* * * * *